US 11,155,692 B2

(12) United States Patent
Richter et al.

(10) Patent No.: US 11,155,692 B2
(45) Date of Patent: Oct. 26, 2021

(54) POLYAMIDE MOLDING COMPOSITIONS WITH IMPROVED OPTICAL PROPERTIES AND USE OF COLORANTS THEREIN

(71) Applicant: BASF SE, Ludwigshafen am Rhein (DE)

(72) Inventors: Florian Richter, Ludwigshafen (DE); Rainer Xalter, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/757,625

(22) PCT Filed: Dec. 17, 2018

(86) PCT No.: PCT/EP2018/085186
§ 371 (c)(1),
(2) Date: Apr. 20, 2020

(87) PCT Pub. No.: WO2019/121506
PCT Pub. Date: Jun. 27, 2019

(65) Prior Publication Data
US 2020/0339778 A1 Oct. 29, 2020

(30) Foreign Application Priority Data
Dec. 18, 2017 (EP) .................................. 17208051

(51) Int. Cl.
| C08K 5/00 | (2006.01) |
| C08K 5/132 | (2006.01) |
| C08K 5/21 | (2006.01) |
| C08K 5/3495 | (2006.01) |
| C09B 1/54 | (2006.01) |
| C09B 67/48 | (2006.01) |
| C09B 57/12 | (2006.01) |
| C08L 77/06 | (2006.01) |
| C08L 77/00 | (2006.01) |

(52) U.S. Cl.
CPC ............ *C08K 5/0041* (2013.01); *C08K 5/132* (2013.01); *C08K 5/21* (2013.01); *C08K 5/3495* (2013.01); *C08L 77/06* (2013.01); *C09B 1/542* (2013.01); *C09B 57/12* (2013.01); *C09B 67/0029* (2013.01); *C08L 77/00* (2013.01)

(58) Field of Classification Search
CPC ......... C08K 5/0041; C08K 5/21; C08L 77/00; C09B 1/542; C09B 67/0029; C09B 57/12
USPC ........................................................ 524/90
See application file for complete search history.

(56) References Cited

U.S. PATENT DOCUMENTS

| 5,326,805 | A | 7/1994 | Sicken |
| 6,369,137 | B2 | 4/2002 | Kersjes |
| 8,278,381 | B2 | 10/2012 | Engelmann et al. |
| 8,293,823 | B2 | 10/2012 | Engelmann et al. |
| 2009/0085019 | A1* | 4/2009 | Buhler ................. C08K 5/3475 252/589 |
| 2013/0253110 | A1* | 9/2013 | Gabriel .................... C08K 5/21 524/212 |
| 2019/0071568 | A1 | 3/2019 | Gabriel et al. |
| 2019/0177537 | A1 | 6/2019 | Gabriel et al. |
| 2019/0224902 | A1 | 7/2019 | Goetz et al. |
| 2020/0123335 | A1 | 4/2020 | Minkwitz et al. |

FOREIGN PATENT DOCUMENTS

| DE | 102004049342 A1 | 4/2006 |
| DE | 102004050025 A1 | 4/2006 |
| EP | 0584567 A2 | 3/1994 |
| EP | 1095030 A1 | 5/2001 |
| JP | H05320501 A | 12/1993 |
| WO | 2013139800 A2 | 9/2013 |
| WO | 2013139802 A1 | 9/2013 |

OTHER PUBLICATIONS

English Translation of International Search Report for International Application No. PCT/EP2018/085186, dated Feb. 18, 2019, 3 pages.

* cited by examiner

*Primary Examiner* — Doris L Lee
(74) *Attorney, Agent, or Firm* — Armstrong Teasdale LLP

(57) ABSTRACT

Disclosed is a method of reducing a haze value in molding compositions including use of colorants selected from anthraquinone colorants, benzimidazolone colorants and perinone colorants. The molding compositions include at least one polyamide and at least one compound of the general formula (I)

$$R^1\underset{H}{N}\underset{}{\overset{O}{\|}}\underset{H}{N}{\left[Z\underset{H}{N}\underset{}{\overset{O}{\|}}\underset{H}{N}\right]}_x R^2, \quad (I)$$

where x is 1, 2 or 3; R1 and R2 are mutually independently selected from hydrogen, linear C1-C7-alkyl, branched C3-C10-alkyl, unsubstituted or substituted C3-C12-cycloalkyl, unsubstituted or substituted C3-C12-cycloalkyl-C1-C4-alkyl, unsubstituted or substituted aryl and unsubstituted or substituted aryl-C1-C4-alkyl; and Z is selected from C3-C10-alkanediyl, unsubstituted or substituted arylene, unsubstituted or substituted arylene-C1-C4-alkylene-arylene, unsubstituted or substituted heteroarylene, unsubstituted or substituted heteroarylene-C1-C4-alkylene-heteroarylene, unsubstituted or substituted C5-C8-cycloalkylene, unsubstituted or substituted C5-C8-cycloalkylene-C1-C4-alkylene-C5-C8-cycloalkylene, unsubstituted or substituted heterocycloalkylene and unsubstituted or substituted heterocycloalkylene-C1-C4-alkylene-heterocycloalkylene.

22 Claims, No Drawings

POLYAMIDE MOLDING COMPOSITIONS WITH IMPROVED OPTICAL PROPERTIES AND USE OF COLORANTS THEREIN

CROSS-REFERENCE TO RELATED APPLICATIONS

This application is a U.S. National Phase Application of PCT/EP2018/085186, filed Dec. 17, 2018, which claims the benefit of priority to EP Application No. 17208051.7, filed Dec. 18, 2017, the contents of which are hereby expressly incorporated by reference in their entirety.

DESCRIPTION

The invention relates to polyamide molding compositions with improved optical properties, and also to the use of colorants to improve said optical properties. The invention further relates to processes for the production of the molding compositions and to use of these for the production of fibers, moldings and films, and also to the resultant fibers, moldings and films.

Polyamides are polymers produced on a major scale worldwide, and are used not only in the main application sectors of films, fibers and moldings (materials for processing) but also for a wide variety of other purposes. The polyamides most widely produced are polyamide 6 (polycaprolactam) and polyamide 66 (nylon, polyhexamethyleneadipamide). Most of the industrially significant polyamides are semicrystalline or amorphous thermoplastic polymers featuring high heat resistance. Many applications of polyamides require that the polyamide has clarity or low haze, in order by way of example to provide visibility of the contents of packaging made of polyamide. Transparent polyamides are therefore desirable. However, many polyamides are semi-crystalline and therefore optically opaque, because incident light is scattered by the crystalline domains within the polyamide. Nucleating agents and clarifying agents are frequently used to improve optical properties in crystallizable thermoplastic polymers.

WO 2013/139802 relates to polymer compositions which comprise at least one polyamide polymer and at least one polyurea compound of a stated formula (I). An example of the compound used is (4-ureidocyclohexyl)urea. These polyurea compounds are used in the polyamides in order to improve clarity, increase light transmittance and reduce haze. However, the polyamide compositions equipped therewith still have a certain residual haze which renders the materials translucent or semitransparent, rather than fully transparent.

It is an object of the present invention to achieve a further haze reduction in the known molding compositions.

The object is achieved in the invention via use of colorants selected from anthraquinone colorants, benzimidazolone colorants and perinone colorants, in molding compositions comprising at least one polyamide and at least one compound of the general formula (I)

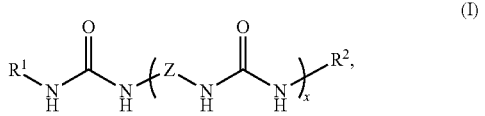

where
x is 1, 2 or 3;
$R^1$ and $R^2$ are mutually independently selected from hydrogen, linear $C_1$-$C_7$-alkyl, branched $C_3$-$C_{10}$-alkyl, or substituted $C_3$-$C_{12}$-cycloalkyl, unsubstituted or substituted $C_3$-$C_{12}$-cycloalkyl-$C_1$-$C_4$-alkyl, unsubstituted or substituted aryl and unsubstituted or substituted aryl-$C_1$-$C_4$-alkyl, and
Z is selected from $C_3$-$C_{10}$-alkanediyl, unsubstituted or substituted arylene, unsubstituted or substituted arylene-$C_1$-$C_4$-alkylene-arylene, unsubstituted or substituted heteroarylene, unsubstituted or substituted heteroarylene-$C_1$-$C_4$-alkylene-heteroarylene, unsubstituted or substituted $C_5$-$C_8$-cyclo-alkylene, unsubstituted or substituted $C_5$-$C_8$-cycloalkylene-$C_1$-$C_4$-alkylene-$C_5$-$C_8$-cycloalkylene, unsubstituted or substituted heterocycloalkylene and unsubstituted or substituted heterocycloalkylene-$C_1$-$C_4$-alkylene-heterocycloalkylene,
to reduce the haze value.

The object is moreover achieved via a molding composition comprising, as component A, at least one polyamide,
as component B, from 0.1 to 2% by weight of at least one compound of the general formula (I)

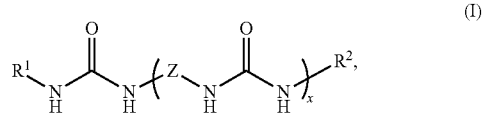

where
x is 1, 2 or 3;
$R^1$ and $R^2$ are mutually independently selected from hydrogen, linear $C_1$-$C_7$-alkyl, branched $C_3$-$C_{10}$-alkyl, or substituted $C_3$-$C_{12}$-cycloalkyl, unsubstituted or substituted $C_3$-$C_{12}$-cycloalkyl-$C_1$-$C_4$-alkyl, unsubstituted or substituted aryl and unsubstituted or substituted aryl-$C_1$-$C_4$-alkyl, and
Z is selected from $C_3$-$C_{10}$-alkanediyl, unsubstituted or substituted arylene, unsubstituted or substituted arylene-$C_1$-$C_4$-alkylene-arylene, unsubstituted or substituted heteroarylene, unsubstituted or substituted heteroarylene-$C_1$-$C_4$-alkylene-heteroarylene, unsubstituted or substituted $C_5$-$C_8$-cyclo-alkylene, unsubstituted or substituted $C_5$-$C_8$-cycloalkylene-$C_1$-$C_4$-alkylene-$C_5$-$C_8$-cycloalkylene, unsubstituted or substituted heterocycloalkylene and unsubstituted or substituted heterocycloalkylene-$C_1$-$C_4$-alkylene-heterocycloalkylene
and also, as component C, from 10 to 1000 ppm of at least one colorant selected from anthraquinone colorants, benzimidazolone colorants and perinone colorants and mixtures thereof,
where the quantities are based on the entire molding composition.

The object is moreover achieved via a process for the production of these molding compositions which comprises mixing components A, B and C, and optionally further ingredients, with one another.

The object is moreover achieved via use of the molding compositions for the production of fibers, films or moldings, and via the resultant fibers, films or moldings.

It has been found in the invention that the optical properties of polyamide compositions comprising a compound of the general formula (I) can be significantly improved by using small quantities of anthraquinone colorants, benzimidazolone colorants or perinone colorants. The improvement here relates to a reduced haze value.

The molding compositions used in the invention exhibit a reduction of the relative haze value by at least 10%, preferably at least 20%, determined by the method of ASTM D1003 (layer thickness 1.27 mm), in comparison with a reference polyamide composition without the colorants.

It is preferable that a proportion of 69 ppm of the colorant of the invention should provide a relative haze reduction of at least 20%. It is preferable that a proportion of 156 ppm of the colorant of the invention should provide a relative haze reduction of at least 25%, the value being determined in each case in accordance with ASTM D1003 (layer thickness 1.27 mm).

The term "haze" defines the percentage of transmitted light exhibiting an average deviation of more than 2.5 degrees from the incident light during passage through a molding (plaque). The haze value is determined in accordance with ASTM D1003. The term "clarity" relates to small-angle scattering in the range below 2.5 degrees, and is a measure of image sharpness. Clarity is likewise determined in accordance with ASTM D1003.

The molding should in essence have flat parallel surfaces which are free from dust, grease, scratches or other impairment. The molding should also have no cavities or inclusions.

The molding compositions of the invention comprise at least one polyamide. Preference is given here to at least one semicrystalline polyamide. The term "semicrystalline" describes a polyamide exhibiting an X-ray diffraction pattern having sharp bands which are characteristic of crystalline regions and diffuse bands which are characteristic of amorphous regions. The term "semicrystalline" therefore describes a polyamide having both crystalline and amorphous regions.

The polyamide composition of the invention comprises, as component A, at least one synthetic polyamide. The term "synthetic polyamide" is interpreted widely for the purposes of the invention. It encompasses very generally polymers which comprise at least one component suitable for polyamide formation, selected from dicarboxylic acids, diamines, salts made of at least one dicarboxylic acid and of at least one diamine, lactams, ω-amino acids, nitriles of aminocarboxylic acids, and mixtures thereof. The synthetic polyamides of the invention can also comprise, incorporated into the polymer alongside the components suitable for polyamide formation, monomers copolymerizable therewith. The term "synthetic polyamide" does not encompass natural polyamides, for example peptides and proteins, e.g. hair, wool, silk or egg white.

Some of the polyamide terminology used for the purposes of the invention involves abbreviated symbols consisting of the letters PA followed by numerals and letters. Some of these abbreviated symbols are standardized in DIN EN ISO 1043-1. Polyamides which can be derived from aminocarboxylic acids of the $H_2N-(CH_2)_x-COOH$ type, or from the corresponding lactams, are characterized as PA Z, where Z indicates the number of carbon atoms in the monomer. By way of example, therefore, PA 6 is the polymer made of ε-caprolactam or of ω-aminocaproic acid. Polyamides that can be derived from diamines and dicarboxylic acids of the $H_2N-(CH_2)_x-NH_2$ type and $HOOC-(CH_2)_y-COOH$ type are characterized as PA Z1Z2, where Z1 is the number of carbon atoms in the diamine and Z2 is the number of carbon atoms in the dicarboxylic acid. The terminology for copolyamides lists the components in the sequence of their quantitative proportions, separated by obliques. By way of example, therefore, PA 66/610 is the copolyamide made of hexamethylenediamine, adipic acid and sebacic acid. The letter abbreviations used for the monomers used in the invention having an aromatic or cycloaliphatic group are as follows: T=terephthalic acid, I=isophthalic acid, MXDA=m-xylylenediamine, IPDA=isophoronediamine, PACM=4,4'-methylenebis(cyclohexylamine), MACM=2,2'-dimethyl-4,4'-methylenebis(cyclohexylamine).

The term "$C_1$-$C_4$-alkyl" hereinafter encompasses unsubstituted, straight-chain and branched $C_1$-$C_4$-alkyl groups. Examples of $C_1$-$C_4$-alkyl groups are in particular methyl, ethyl, propyl, isopropyl, n-butyl, isobutyl, sec-butyl, tert-butyl (1,1-dimethylethyl).

The carboxy groups in the aliphatic dicarboxylic acids, cycloaliphatic dicarboxylic acids, aromatic dicarboxylic acids and monocarboxylic acids mentioned hereinafter can respectively be present in non-derivatized form or in the form of derivatives. In the case of dicarboxylic acids, the number of carboxy groups present in the form of a derivative can be zero, one or two. Suitable derivatives are anhydrides, esters, acyl chlorides, nitriles and isocyanates. Preferred derivatives are anhydrides or esters. Anhydrides of dicarboxylic acids can be present in monomeric or polymeric form. Preferred esters are alkyl esters and vinyl esters, particularly preferably $C_1$-$C_4$-alkyl esters, in particular the methyl esters or ethyl esters. Dicarboxylic acids are preferably present in the form of mono- or dialkyl esters, particularly mono- or di-$C_1$-$C_4$-alkyl esters, in particular monomethyl esters, dimethyl esters, monoethyl esters or diethyl esters. It is further preferable that dicarboxylic acids are present in the form of mono- or divinyl esters. It is further preferable that dicarboxylic acids are present in the form of mixed esters, particularly mixed esters having different $C_1$-$C_4$-alkyl components, in particular methyl ethyl esters.

Components suitable for polyamide formation are preferably selected from pA) unsubstituted or substituted aromatic dicarboxylic acids and derivatives of unsubstituted or substituted aromatic dicarboxylic acids,
pB) unsubstituted or substituted aromatic diamines,
pC) aliphatic or cycloaliphatic dicarboxylic acids,
pD) aliphatic or cycloaliphatic diamines,
pE) monocarboxylic acids,
pF) monoamines,
pG) at least trifunctional amines,
pH) lactams,
pI) ω-amino acids,
pK) compounds differing from pA) to pI) but cocondensable therewith.

A suitable embodiment is provided by aliphatic polyamides. For aliphatic polyamides of the PA Z1 Z2 type (for example PA 66), the rule is that at least one of components pC) or pD) must be present and none of components pA) and pB) is permitted to be present. For aliphatic polyamides of the PAZ type (for example PA 6 or PA 12), the rule is that at least component pH) must be present.

Another suitable embodiment is provided by semiaromatic polyamides. For semiaromatic polyamides, the rule is that at least one of components pA) or pB) and at least one of components pC) or pD) must be present.

The aromatic dicarboxylic acids pA) are preferably selected from respectively unsubstituted or substituted phthalic acid, terephthalic acid, isophthalic acid, naphthalenedicarboxylic acids and biphenyldicarboxylic acids and the derivatives and mixtures of the abovementioned aromatic dicarboxylic acids.

It is preferable that substituted aromatic dicarboxylic acids pA) have at least one (for example, 1, 2, 3 or 4) $C_1$-$C_4$-alkyl moiety. In particular, substituted aromatic dicarboxylic acids pA) have 1 or 2 $C_1$-$C_4$-alkyl moieties. These are preferably selected from methyl, ethyl, n-propyl, isopropyl, n-butyl, iso-butyl, sec-butyl and tert-butyl, particularly methyl, ethyl and n-butyl, in particular methyl and ethyl and specifically methyl. Substituted aromatic dicarboxylic acids pA) can also bear further functional groups which do not disrupt amidation, an example being 5-sulfoisophthalic acid and its salts and derivatives. Preferred example here is the sodium salt of the dimethyl ester of 5-sulfoisophthalic acid.

It is preferable that the aromatic dicarboxylic acid pA) is selected from unsubstituted terephthalic acid, unsubstituted isophthalic acid, unsubstituted napthalenedicarboxylic acids, 2-chloroterephthalic acid, 2-methylterephthalic acid, 5-methylisophthalic acid and 5-sulfoisophthalic acid.

The following are particularly preferably used as aromatic dicarboxylic acid pA): terephthalic acid; isophthalic acid or a mixture of terephthalic acid and isophthalic acid.

It is preferable that the semiaromatic polyamides comprise a proportion of aromatic dicarboxylic acids that is at least 50 mol %, based on all of the dicarboxylic acids, particularly preferably from 70 mol % to 100 mol %. In a specific embodiment, the semiaromatic polyamides comprise a prosulfoisophthalic sulfoisophthalic of at least 50 mol % of terephthalic acid or isophthalic acid, or of a mixture of terephthalic acid and isophthalic acid, based on all of the dicarboxylic acids, preferably from 70 mol % to 100 mol %.

The aromatic diamines pB) are preferably selected from bis(4-aminophenyl)methane, 3-methylbenzidine, 2,2-bis(4-aminophenyl)propane, 1,1-bis(4-aminophenyl)cyclohexane, 1,2-diaminobenzene, 1,4-diaminobenzene, 1,4-diaminonaphthalene, 1,5-diaminonaphthalene, 1,3-diaminotoluene(s), m-xylylenediamine, N,N'-dimethyl-4,4'-biphenyldiamine, bis(4-methylaminophenyl)methane, 2,2-bis(4-methylaminophenyl)propane and mixtures thereof.

The aliphatic or cycloaliphatic dicarboxylic acids pC) are preferably selected from oxalic acid, malonic acid, succinic acid, glutaric acid, adipic acid, primelic acid, suberic acid, azelazic acid, sebacic acid, undecane-$\alpha,\omega$-dicarboxylic acid, dodecane-$\alpha,\omega$-dicarboxylic acid, maleic acid, fumaric acid and itaconic acid, cis- and trans-cyclohexane-1,2-dicarboxylic acid, cis- and transcyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid and mixtures thereof.

The aliphatic or cycloaliphatic diamines pD) are preferably selected from ethylenediamine, propylenediamine, tetramethylenediamine, heptamethylenediamine, hexamethylenediamine, pentamethylenediamine, octamethylenediamine, nonamethylenediamine, decamethylenediamine, undecamethylenediamine, dodecamethylenediamine, 2-methylpentamethylenediamine, 2,2,4-trimethylhexamethylenediamine, 2,4,4-trimethylhexamethylenediamine, 5-methylnonamethylenediamine, 2,4-dimethyloctamethylenediamine, 5-methylnonanediamine, bis(4-aminocyclohexyl)methane, 3,3'-dimethyl-4,4'-diaminodicyclohexylmethane and mixtures thereof.

It is particularly preferable that the diamine pD) is selected from hexamethylenediamine, 2-methylpentamethylenediamine, octamethylenediamine, nonamethylenediamine, 2-methyl-1,8-octamethylenediamine, decamethylenediamine, undecamethylenediamine, dodecamethylenediamine, bis(4-aminocyclohexyl)methane, 3,3'-dimethyl-4,4'-diaminodicyclohexylmethane and mixtures thereof.

In a specific embodiment, the semiaromatic polyamides comprise, incorporated into the polymer, at least one diamine pD) selected from hexamethylenediamine, bis(4-aminocyclohexyl)methane (PACM), 3,3'-dimethyl-4,4'-diaminodicyclohexylmethane (MACM), isophoronediamine (IPDA) and mixtures thereof.

In a specific embodiment, the semiaromatic polyamides comprise, as diamine pD) incorporated into the polymer, exclusively hexamethylenediamine.

In another specific embodiment, the semiaromatic polyamides comprise, as diamine pD) incorporated into the polymer, exclusively bis(4-aminocyclohexyl)methane.

In another specific embodiment, the semiaromatic polyamides comprise, as diamine pD) incorporated into the polymer, exclusively 3,3'-dimethyl-4,4'-diaminodicyclohexylmethane (MACM).

In another specific embodiment, the semiaromatic polyamides comprise, as diamine pD) incorporated into the polymer, exclusively isophoronediamine (IPDA).

The aliphatic polyamides and the semiaromatic polyamides can comprise, incorporated into the polymer, at least one monocarboxylic acid pE). The monocarboxylic acids pE) here serve for end-capping of the polyamides produced in the invention. In principle, suitable compounds are any of the monocarboxylic acids capable of reacting, under the reaction conditions of polyamide condensation, with at least a portion of the available amino groups. Suitable monocarboxylic acids pE) are aliphatic monocarboxylic acids, alicyclic monocarboxylic acids and aromatic monocarboxylic acids. Among these are acetic acid, propionic acid, n-, iso- and tert-butyric acid, valeric acid, trimethylacetic acid, caproic acid, enanthic acid, caprylic acid, pelargonic acid, capric acid, undecanoic acid, lauric acid, tridecanoic acid, myristic acid, palmitic acid, stearic acid, pivalic acid, cyclohexanecarboxylic acid, benzoic acid, methylbenzoic acid, $\alpha$-naphthalenecarboxylic acid, $\beta$-naphthalenecarboxylic acid, phenylacetic acid, oleic acid, ricinoleic acid, linoleic acid, linolenic acid, erucic acid, fatty acids derived from soy, linseed, castor or sunflower, acrylic acid, methacrylic acid, Versatic® acids, Koch® acids and mixtures thereof.

If unsaturated carboxylic acids or derivatives thereof are used as monocarboxylic acids pE), it can be advisable to operate in the presence of commercially available polymerization inhibitors.

It is particularly preferable that the monocarboxylic acid pE) is selected from acetic acid, propionic acid, benzoic acid and mixtures thereof.

In a specific embodiment, the aliphatic polyamides and the semiaromatic polyamides comprise, as monocarboxylic acid pE) incorporated into the polymer, exclusively propionic acid.

In another specific embodiment, the aliphatic polyamides and the semiaromatic polyamides comprise, as monocarboxylic acid pE) incorporated into the polymer, exclusively benzoic acid.

In another specific embodiment, the aliphatic polyamides and the semiaromatic polyamides comprise, as monocarboxylic acid pE) incorporated into the polymer, exclusively acetic acid.

The aliphatic polyamides and the semiaromatic polyamides can comprise, incorporated into the polymer, at least one monoamine pF). The aliphatic polyamides here comprise only aliphatic monoamines or alicyclic monoamines incorporated into the polymer. The monoamines pF) here serve for end-capping of the polyamides produced in the invention. Suitable compounds are in principle any of the monoamines capable, under the reaction conditions of polyamide condensation, of reacting with at least a portion of the available carboxylic acid groups. Suitable monoamines pF) are aliphatic monoamines, alicyclic monoamines and aromatic monoamines. Among these are methylamine, ethylamine, propylamine, butylamine, hexylamine, heptylamine, octylamine, decylamine, stearylamine, dimethylamine, diethylamine, dipropylamine, dibutylamine, cyclohexylamine, dicyclohexylamine, aniline, toluidine, diphenylamine, naphthylamine and mixtures thereof.

Production of the aliphatic and semiaromatic polyamides can additionally use at least one at least trifunctional amine pG). Among these are N'-(6-aminohexyl)hexane-1,6-diamine, N'-(12-aminododecyl)dodecane-1,12-diamine, N'-(6-aminohexyl)dodecane-1,12-diamine, N'-[3-(aminomethyl)3,5,5-trimethylcyclohexyl]hexane-1,6-diamine, N'-[3-(aminomethyl)3,5,5-trimethylcyclohexyl]dodecane-1,12-diamine, N'-[(5-amino-1,3,3-trimethylcyclohexyl)-methyl]hexane-1,6-diamine N'-[(5-amino-1,3,3-trimethylcyclohexyl)methyl]dodecane-1,12-diamine-3-R [[[3-(aminomethyl)-3,5,5-trimethylcyclohexyl]amino]methyl]-3,5,5-trimethylcyclohexylamine-3-[[(5-amino-1,3,3-trimethylyclohexyl)methylamino]methyl]-3,5,5-trimethylcyclohexylamine-3-(aminomethyl)-N-[3-(aminomethyl)-3,5,5-trimethylcyclohexyl]-3,5,5-trimethylcyclohexylamine. It is preferable that at least trifunctional amines pG) are not used.

Suitable lactams pH) are ε-caprolactam, 2-piperidone (δ-valerolactam), 2-pyrrolidone (γ-butyrolactam), caprolactam, enantholactam, laurolactam and mixtures thereof.

Suitable ω-amino acids pI) are 6-aminocaproic acid, 7-aminoheptanoic acid, 11-aminoundecanoic acid, 12-aminododecanoic acid and mixtures thereof.

Suitable compounds pK) that differ from pA) to pI) but are cocondensable therewith are at least tribasic carboxylic acids, diaminocarboxylic acids, etc.

Other suitable compounds pK) are 4-[(Z)N-(6-aminohexyl)-C-hydroxycarbonimidoyl]benzoic acid, 3-[(Z)N-(6-aminohexyl)-C-hydroxycarbonimidoyl]benzoic acid, (6Z)6-(6-aminohexylimino)-6-hydroxyhexanecarboxylic acid, 4-[(Z)N-[(5-amino-1,3,3-trimethylcyclohexyl)methyl]-C-hydroxycarbonimidoyl]benzoic acid, 3-[(Z)N-[(5-amino-1,3,3-trimethylcyclohexyl)methyl]-C-hydroxycarbonimidoyl]benzoic acid, 4-[(Z)N-[3-(aminomethyl)-3,5,5-trimethylcyclohexyl]-C-hydroxycarbonimidoyl]benzoic acid, 3-[(Z)N-[3-(aminomethyl)-3,5,5-trimethylcyclohexyl]-C-hydroxycarbonimidoyl]benzoic acid and mixtures thereof.

It is preferable that polyamide A is selected from PA 4, PA 5, PA 6, PA 7, PA 8, PA 9, PA 10, PA 11, PA 12, PA 46, PA 66, PA 666, PA 69, PA 610, PA 612, PA 96, PA 99, PA 910, PA 912, PA 1010, PA 1212, PA 6.T, PA 9.T, PA8.T, PA 10.T, PA 12.T, PA 6.I, PA 8.I, PA 9.I, PA 10.I, PA 12.I, PA 6.T/6, PA 6.T/10, PA 6.T/12, PA 6.T/6.I, PA 6.T/8.T, PA 6.T/9.T, PA 6.T/10T, PA 6.T/12.T, PA 12.T/6.T, PA 6.T/6.I/6, PA 6.T/6.I/12, PA 6.T/6.I/6.10, PA 6.T/6.I/6.12, PA 6.T/6.6, PA 6.T/6.10, PA 6.T/6.12, PA 10.T/6, PA 10.T/11, PA 10.T/12, PA 8.T/6.T, PA 8.T/66, PA 8.T/8.I, PA 8.T/8.6, PA 8.T/6.I, PA 10.T/6.T, PA 10.T/6.6, PA 10.T/10.I, PA 10T/10.I/6.T, PA 10.T/6.I, PA 4.T/4.I/46, PA 4.T/4.I/6.6, PA 5.T/5.I, PA 5.T/5.I/5.6, PA 5.T/5.I/6.6, PA 6.T/6.I/6.6, PA MXDA.6, PA IPDA.I, PA IPDA.T, PA MACM.I, PA MACM.T, PA PACM.I, PA PACM.T, PA MXDA.I, PA MXDA.T, PA 6.T/IPDA.T, PA 6.T/MACM.T, PA 6.T/PACM.T, PA 6.T/MXDA.T, PA 6.T/6.I/8.T/8.I, PA 6.T/6.I/10.T/10.I, PA 6.T/6.I/IPDA.T/IPDA.I, PA 6.T/6.I/MXDA. T/MXDA.I, PA 6.T/6.I/MACM.T/MACM.I, PA 6.T/6.I/PACM. T/PACM.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T and copolymers and mixtures thereof.

In a preferred embodiment, the polyamide composition of the invention comprises, as component A, at least one aliphatic polyamide.

The polyamide is then preferably selected from PA 4, PA 5, PA 6, PA 7, PA 8, PA 9, PA 10, PA 11, PA 12, PA 46, PA 66, PA 666, PA 69, PA 610, PA 612, PA 96, PA 99, PA 910, PA 912, PA 1010, PA 1212, and copolymers and mixtures thereof.

Polyamides that are particularly preferably used are PA 6, PA 7, PA 10, PA 11, PA 12, PA 46, PA 66, PA 6/66, PA 66/6, PA 69, PA 610, PA 612, PA 1010, PA 1012 and PA 1212.

The aliphatic polyamide A is in particular selected from PA 6, PA 66, PA 666 and PA 12. A specific embodiment is provided by polyamide compositions in which component A comprises PA 6 or PA 66 or consists of PA 6 or PA 66.

In another preferred embodiment, the process of the invention serves for the production of a semiaromatic polyamide.

The polyamide A is then preferably selected from PA 6.T, PA 9.T, PA 10.T, PA 12.T, PA 6.I, PA 9.I, PA 10.I, PA 12.I, PA 6.T/6.I, PA 6.T/6, PA 6.T/8.T, PA 6.T/10T, PA 10.T/6.T, PA 6.T/12.T, PA12.T/6.T, PA IPDA.I, PA IPDA.T, PA 6.T/IPDA.T, PA 6.T/6.I/IPDA.T/IPDA.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T and copolymers and mixtures thereof.

The following data relating to the number-average molar mass $M_n$ and the weight-average molar mass $M_w$ relate for the purposes of this invention to determination by means of gel permeation chromatography (GPC). Calibration is achieved by using by way of example PMMA as polymer standard with low polydispersity.

The number-average molar mass Mn of the synthetic polyamide A is preferably in the range from 8000 to 50 000 g/mol, particularly from 10 000 to 35 000 g/mol.

The weight-average molar mass $M_n$ of the synthetic polyamide A is preferably in the range from 15 000 to 20 000 g/mol, particularly from 20 000 to 125 000 g/mol.

The polydispersity PD ($=M_w/M_n$) of the polyamides A is preferably at most 6, particularly preferably at most 5, in particular at most 3.5.

It is also possible to use copolymers, for example PA 6/66 or PA 66/6, and also PA 66/610.

The proportions of the comonomers in the copolyamides can be selected in the range from 5:95 to 95:5, preferably from 90:10 to 10:90.

It is particularly preferable in the invention to use, as semicrystalline polyamide, polyamide 6 or polyamide 66.

The quantity of component A present is preferably at least 60% by weight, particularly preferably at least 80% by weight, in particular at least 90% by weight.

The proportion of the (preferably semicrystalline) polyamide as component A in the molding compositions is preferably from 60 to 99.89% by weight, particularly preferably from 80 to 99.89% by weight, in particular from 90 to 99.89% by weight. The major portion of the molding compositions is thus composed of polyamide or polyamides of component A.

The molding compositions comprise, as component B, from 0.1 to 2% by weight, preferably from 0.2 to 1.7% by weight, in particular from 0.5 to 1.5% by weight of at least one compound of the general formula (I). The constitution of this compound can be as in WO 2013/139802. Processes for production thereof are also described in that document and in DE 2710595, and also in Journal für praktische Chemie (1915), vol. 91, pages 1 to 38 and Chem. Eur. J. 1997, 3, pages 1238 to 1243.

Preferred compounds of the general formula (I) are described in WO 2013/139802, in particular on pages 11 to 14.

Here x has the value 1 or 2, in particular 1.

Preferred compounds of the general formula (I) are those where $R^1$ and $R^2$ are mutually independently selected from linear $C_1$-$C_1$-alkyl, branched $C_3$-$C_{10}$-alkyl, unsubstituted or substituted $C_3$-$C_{12}$-cycloalkyl, unsubstituted or substituted $C_3$-$C_{12}$-cycloalkyl-$C_1$-$C_4$-alkyl, unsubstituted or substituted aryl and unsubstituted or substituted aryl-$C_1$-$C_4$-alkyl;

where $R^1$ and $R^2$ are mutually independently selected from hydrogen, branched $C_3$-$C_{10}$-alkyl, $C_5$-$C_{12}$-cycloalkyl, $C_5$-$C_{12}$-cycloalkyl-$C_1$-$C_4$-alkyl, phenyl and phenyl-$C_1$-$C_4$-alkyl, where each ring in the four last-mentioned moieties is unsubstituted or has substitution by one or more identical or different moieties $R^a$, where $R^a$ is selected from $C_1$-$C_{10}$-alkyl and halogen;

where $R^1$ and $R^2$ are mutually independently selected from branched $C_3$-$C_{10}$-alkyl bonded to the main skeleton by way of a secondary or tertiary carbon atom of the alkyl group, $C_5$-$C_{10}$-cycloalkyl which is unsubstituted or has substitution by 1 or 2 $R^a$ moieties, and phenyl which is unsubstituted or has substitution by 1 or 2 $R^a$ moieties.

In one embodiment of the invention, $R^1$ and $R^2$ can be identical.

It is preferable that Z is $C_5$-$C_8$-alkanediyl, $C_5$-$C_7$-cycloalkylene, $C_5$-$C_7$-cycloalkylene-$CH_2$—$C_5$-$C_7$-cycloalkylene, phenylene or phenylene-$CH_2$-phenylene, where each ring in the four last-mentioned moieties is unsubstituted or has substitution by one or two identical or different moieties $R^b$, where $R^b$ is selected from $C_1$-$C_{10}$-alkyl and halogen.

It is particularly preferably that Z is linear $C_{5-8}$-alkanediyl or $C_{5-7}$-cycloalkylene.

It is specifically preferable that Z is trans-1,4-cyclohexylene.

Preference is given to compounds of the general formula (I) where $R^1$ and $R^2$ are identical and are selected from hydrogen, tert-butyl, 1,1-dimethylpropyl, 1,5-dimethylhexyl, 1,1,3,3-tetramethylbutyl and 1-adamantyl; Z is trans-1,4-cyclohexylene and x is 1.

It is particularly preferable that $R^1$ and $R^2$ in the formula (I) are identical and selected from hydrogen, tert-butyl, 1,1-dimethylpropyl, 1,5-dimethylhexyl, 1,1,3,3-tetramethylbutyl and 1-adamantyl. Z here is preferably 1,4-cyclohexylene (trans-1,4-cyclohexanediyl). The value of x is preferably 1.

It is specifically preferable that $R^1$ and $R^2$ are hydrogen, Z is trans-1,4-cyclohexylene (trans-1,4-cyclohexanediyl), and that the value of x is 1.

Preference is in particular given to these compounds in combination with a polyamide selected from PA 6, PA 11, PA 12, PA 66, PA 610, PA 66/6 and PA 6/66.

The compounds of the general formula (I) can be produced as described in WO 2013/139802.

At least one colorant is used as component C, selected from anthraquinone colorants, benzimidazolone colorants and perinone colorants. These colorants are preferably dyes, pigments or mixtures of these.

The invention uses a quantity of from 10 to 1000 ppm of the colorant, preferably from 20 to 500 ppm, in particular from 50 to 200 ppm, based on the entire molding composition.

The ratio by weight of component C to the component B is preferably from 1:1 to 1:1000, particularly preferably from 1:5 to 1:700, in particular from 1:10 to 1:500, specifically from 1:25 to 1:300.

Anthraquinone colorants are anthraquinone dyes or anthraquinone pigments, where these have an anthraquinone unit or a unit derived from anthraquinone in their main skeleton. Other terms used for anthraquinone are 9,10-anthraquinone and 9,10-dihydroanthracene-9,10-dione.

The main anthraquinone structure can also have substitution, for example by alkyl, aryl, aralkyl, alkaryl, —OH, —$NH_2$, —$SO_3H$, or —$NO_2$. It is also possible to produce an anthraquinone derivative via substitution at a C=O group.

The structure of the anthraquinone colorants can comprise, in addition to the anthraquinone moiety, at least one further aromatic ring.

Suitable anthraquinone dyes are known to the person skilled in the art. Examples of suitable anthraquinone dyes are Solvent Red 52, Solvent Blue 132 and Solvent Green 3.

Benzimidazolone colorants are benzimidazolone dyes or benzimidazolone pigments. They preferably have a benzimidazolone structure in their main skeleton. Other terms used for benzimidazolone are 2-hydroxybenzimidazole, 2(1H)-benzimidazolone and 1,3-dihydro-2H-benzimidazol-2-one. The main structure of benzimidazolone by way of example forms part of the benzimidazolone pigments. Benzimidazolone colorants are known per se. The colorants can optionally comprise an azo group as structural element. Their structure can comprise, alongside the abovementioned substituents, or alternatively, at least one further aromatic ring.

Perinone colorants are perinone dyes or perinone pigments, comprising a main skeleton derived from perinone.

Other terms used for perinone structures are trans-perinone and bisbenzimidazo(2,1-b:2',1'-i)benzo[lmn](3,8)phenanthroline-8,17-dione. It is also possible that perinone colorants comprise only one benzimidazole structure. An example of this type is Solvent Red 179.

The perinone dyes, too, can have substitution by the abovementioned substituents, and their structure can comprise at least one further aromatic ring. Preference is therefore given to dyes or pigments which comprise at least one anthraquinone unit, at least one benzimidazolone unit or at least one perinone structural unit in the main skeleton.

It is moreover also possible to use the dye Amaplast OR GXP from ColorChem International Corp., USA, as colorant in the molding compositions of the invention.

In one embodiment, the anthraquinone colorants, benzimidazolone colorants and perinone colorants comprise no perylene structures, naphthalimide structures or benzanthrone structures.

It is also preferable that no chromate complexes are involved.

It has been found in the invention that the use of small quantities of these colorants improves the optical properties of polyamides, although they absorb light and thus reduce total transmittance. In combination with the compounds of the general formula (I), they lead to reduced haze and therefore to increased transparency.

The molding compositions of the invention can also comprise further ingredients, the quantity of which is by way of example from 0 to 39.89% by weight, particularly preferably from 0 to 19.89% by weight, in particular from 0 to 9.89% by weight. Together with the quantities stated above for component A and components B and C, the result is therefore 100% by weight for the entire molding composition.

If further ingredients are present, the smallest quantity is preferably 0.001% by weight, particularly preferably 0.01% by weight, in particular 0.1% by weight.

Resultant quantitative proportions are therefore from 0.001 to 39.89% by weight, preferably from 0.01 to 19.89% by weight, in particular from 0.1 to 9.89% by weight. The upper limit for component A is reduced by the minimum content of the further ingredients, insofar as these are present.

By way of example, glass fibers or fillers and reinforcing materials can be used concomitantly as further ingredients (component D).

The term "filler and reinforcing material" (=possible component D) is interpreted widely for the purposes of the invention, and comprises particulate fillers, fibrous materials and all conceivable intermediate forms. Particulate fillers can have a wide range of particle sizes, extending from particles in the form of dusts to coarse-grain particles. Filler material that can be used comprises organic and inorganic fillers and reinforcing materials. It is possible by way of example to use inorganic fillers such as kaolin, chalk, wollastonite, talc, calcium carbonate, silicates, titanium dioxide, zinc oxide, graphite, glass particles, e.g. glass spheres, nanoscale fillers such as carbon nanotubes, nanoscale phyllosilicates, nanoscale aluminum oxide ($Al_2O_3$), nanoscale titanium dioxide ($TiO_2$), graphene, permanently magnetic or magnetizable metal compounds and/ or alloys, phyllosilicates and nanoscale silicon dioxide ($SiO_2$). The fillers can also have been surface-treated.

Examples of phyllosilicates that can be used in the molding compositions of the invention are kaolins, serpentines, talc, micas, vermiculites, illites, smectites, montmorillonite, hectorite, double hydroxides and mixtures thereof. The phyllosilicates can have been surface-treated or can be untreated.

It is moreover possible to use one or more fibrous materials. These are preferably selected from known inorganic reinforcement fibers such as boron fibers, carbon fibers, silica fibers, ceramic fibers and basalt fibers; organic reinforcement fibers such as aramid fibers, polyester fibers, nylon fibers, polyethylene fibers and natural fibers such as wood fibers, flax fibers, hemp fibers and sisal fibers.

In particular, it is preferable to avoid use of glass fibers, fillers and reinforcing materials, because they can impair the optical properties of the molding compositions.

It is also possible to use optical scattering agents to achieve homogeneously diffuse scattering of transmitted light with little change of color. By way of example, it is possible to use emulsion polymers derived from polyacrylates or from styrene (co)polymers.

Concomitant use can be made of further polymers in addition to the polyamide.

The thermoplastic polymers different from component A are preferably selected from
homo- or copolymers which comprise, incorporated into the polymer, at least one monomer selected from $C_2$-$C_{10}$ monoolefins, for example ethylene or propylene, 1,3-butadiene, 2-chloro-1,3-butadiene, vinyl alcohol and $C_2$-$C_{10}$-alkyl esters thereof, vinyl chloride, vinylidene chloride, vinylidene fluoride, tetrafluoroethylene, glycidyl acrylate, glycidyl methacrylate, acrylates and methacrylates having alcohol components derived from branched or unbranched $C_1$-$C_{10}$ alcohols, vinylaromatics, for example styrene, acrylonitrile, methacrylonitrile, α,β-ethylenically unsaturated mono- and dicarboxylic acids, and maleic anhydride,
homo- and copolymer of vinylacetals,
polyvinyl esters,
polycarbonates (PC),
polyesters, for example polyalkylene terephthalates, polyhydroxyalkanoates (PHA), polybutylene succinates (PBS), polybutylene succinate adipates (PBSA),
polyethers,
polyetherketones,
thermoplastic polyurethanes (TPU),
polysulfides,
polysulfones,
polyether sulfones,
cellulose alkyl esters
and mixtures thereof.

Mention may be made by way of example of polyacrylates having identical or different alcohol moieties from the group of the $C_4$-$C_8$ alcohols, particularly of butanol, hexanol, octanol and 2-ethylhexanol, polymethyl methacrylate (PMMA), methyl methacrylate-butyl acrylate copolymers, acrylonitrile-butadiene-styrene copolymers (ABS), ethylene-propylene copolymers, ethylene-propylene-diene copolymers (EPDM), polystyrene (PS), styrene-acrylonitrile copolymers (SAN), acrylonitrile-styrene-acrylate (ASA), styrene-butadiene-methyl methacrylate copolymers (SBMMA), styrene-maleic anhydride copolymers, styrene-methacrylic acid copolymers (SMA), polyoxymethylene (POM), polyvinyl alcohol (PVAL), polyvinyl acetate (PVA), polyvinylbutyral (PVB), polycaprolactone (PCL), polyhydroxybutyric acid (PHB), polyhydroxyvaleric acid (PHV), polylactic acid (PLA), ethylcellulose (EC), cellulose acetate (CA), cellulose propionate (CP) and cellulose acetate/butyrate (CAB).

It is preferable that the at least one thermoplastic polymer comprised in the molding composition of the invention is polyvinyl chloride (PVC), polyvinylbutyral (PVB), homo- or copolymer of vinyl acetate, homo- or copolymer of styrene, or is polyacrylate, thermoplastic polyurethane (TPU) or polysulfide.

Suitable preferred additives D are lubricants such as N,N'-ethylenebis(stearamide) and heat stabilizers, and also flame retardants, light stabilizers (UV stabilizers, UV absorbers or UV blockers), nucleating agents, antistatic agents, conductivity additives, mold-release agents, optical brighteners, antifoams, etc.

The molding compositions of the invention can preferably comprise, as component D, from 0.01 to 3% by weight, particularly from 0.02 to 2% by weight, in particular from 0.05 to 1.0% by weight, of at least one heat stabilizer, based on the total weight of composition.

The heat stabilizers are preferably selected from copper compounds, secondary aromatic amines, sterically hindered phenols, phosphites, phosphonites and mixtures thereof.

Insofar as a copper compound is used, the quantity of copper is preferably from 0.003 to 0.5% by weight, in particular from 0.005 to 0.3% by weight and particularly preferably from 0.01 to 0.2% by weight, based on the total weight of the composition.

Insofar as stabilizers based on secondary aromatic amines are used, the quantity of these stabilizers is preferably from 0.2 to 2% by weight, particularly preferably from 0.2 to 1.5% by weight, based on the total weight of the composition.

Insofar as stabilizers based on sterically hindered phenols are used, the quantity of these stabilizers is preferably from 0.1 to 1.5% by weight, particularly preferably from 0.2 to 1% by weight, based on the total weight of the composition.

Insofar as stabilizers based on phosphites and/or on phosphonites are used, the quantity of these stabilizers is preferably from 0.1 to 1.5% by weight, particularly preferably from 0.2 to 1% by weight, based on the total weight of the composition.

Suitable compounds D of mono- or divalent copper are by way of example salts of mono- or divalent copper with inorganic or organic acids or with mono- or difunctional phenols, the oxides of mono- or divalent copper or the complexes of copper salts with ammonia, with amines, with amides, with lactams, with cyanides or with phosphines, preferably the Cu(I) or Cu(II) salts of hydrohalic acids, of hydrocyanic acids, or the copper salts of aliphatic carboxylic acids. Particular preference is given to the monovalent copper compounds CuCl, CuBr, CuI, CuCN and Cu$_2$O, and also the divalent copper compounds CuCl$_2$, CuSO$_4$, CuO, copper(II) acetate and copper(II) stearate.

The copper compounds are available commercially, or production thereof is known to the person skilled in the art. The copper compound can be used per se or in the form of concentrates. Concentrate here means a polymer, preferably of the same chemical type as component A, comprising a high concentration of the copper salt. The use of concentrates is a conventional method, and is particularly frequently used when there is a requirement to meter very small quantities of a starting material. The copper compounds are advantageously used in combination with further metal halides, in particular alkali metal halides, for example NaI, KI, NaBr, KBr, where the molar ratio of metal halide to copper halide is from 0.5 to 20, preferably from 1 to 10 and particularly preferably from 3 to 7.

Particularly preferred examples of stabilizers that can be used in the invention and are based on secondary aromatic amines are adducts made of phenylenediamine with acetone (Naugard® A), adducts made of phenylenediamine with linolenic acid, 4,4'-bis(α,α-dimethylbenzyl)diphenylamine (Naugard® 445), N,N'-dinaphthyl-p-phenylenediamine, N-phenyl-N'-cyclohexyl-p-phenylenediamine and mixtures of two or more thereof.

Preferred examples of stabilizers that can be used in the invention and are based on sterically hindered phenols are N,N'-hexamethylenebis-3-(3,5-di-tert-butyl-4-hydroxyphenyl)propionamide, glycol bis(3,3-bis(4'-hydroxy-3'-tert-butylphenyl)butanoate, 2,1'-thioethylbis(3-(3,5-di-tert-butyl-4-hydroxyphenyl)propionate, 4,4'-butylidenebis(3-methyl-6-tert-butylphenol), triethylene glycol 3-(3-tert-butyl-4-hydroxy-5-methylphenyl)propionate and mixtures of two or more of these stabilizers.

Preferred phosphites and phosphonites are triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butylphenyl)) pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenzo[d,g]-1,3,2-dioxaphosphocine, 6-fluoro-2,4,8,10-tetra-tert-butyl-12-methyl-dibenzo[d,g]-1,3,2-dioxaphosphocine, bis(2,4-di-tert-butyl-6-methylphenyl) methyl phosphite and bis(2,4-di-tert-butyl-6-methylphenyl) ethyl phosphite. In particular, preference is given to tris[2-tert-butyl-4-thio(2'-methyl-4'-hydroxy-5'-tert-butyl)phenyl-5-methyl]phenyl phosphite and tris(2,4-di-tert-butylphenyl) phosphite (Irgafos® 168: product commercially available from BASF SE).

The molding compositions of the invention can comprise, as additive D, from 0 to 15% by weight, particularly preferably from 0 to 10% by weight, based on the total weight of the composition, of at least one flame retardant. If the molding compositions of the invention comprise at least one flame retardant, the quantity thereof is preferably from 0.01 to 15% by weight, particularly preferably from 0.1 to 10% by weight, based on the total weight of the composition. Flame retardants that can be used are halogen-containing and halogen-free flame retardants and their synergists (see also Gächter/Müller, 3$^{rd}$ edn. 1989, Hanser Verlag, chapter 11). Preferred halogen-free flame retardants are red phosphorus, phosphinic or diphosphinic salts, and/or nitrogen-containing flame retardants such as melamine, melamine cyanurate, melamine sulfate, melamine borate, melamine oxalate, melamine phosphate (prim., sec.) or sec. melamine pyrophosphate, melamine neopentyl glycol borate, guanidine, and derivatives thereof known to the person skilled in the art, and also polymeric melamine phosphate (CAS No.: 56386-64-2 or 218768-84-4, and also EP-A-1 095 030), ammonium polyphosphate, trishydroxyethyl isocyanurate (optionally also ammonium polyphosphate in a mixture with trishydroxyethyl isocyanurate) (EP-A-058 456 7). Further N-containing or P-containing flame retardants, or PN condensates suitable as flame retardants, can be found in DE-A-10 2004 049 342, as also can the synergists conventionally used for this purpose, for example oxides or borates. Examples of suitable halogen-containing flame retardants are oligomeric brominated polycarbonates (BC 52 Great Lakes) and polypentabromobenzyl acrylates with N greater than 4 (FR 1025 Dead sea bromine), reaction products of tetrabromobisphenol A with epoxides, other examples being brominated oligomeric or polymeric styrenes, and Dechlorane, these mostly being used with antimony oxides as synergists (for details and further flame retardants: see DE-A-10 2004 050 025).

The entirety of the ingredients in the molding compositions of the invention amounts to 100% by weight. The quantities of the individual components are therefore combined in a manner that gives a total quantity of 100% by weight.

The polyamide molding compositions are produced by processes known per se. Among these are mixing of the components in the appropriate proportions by weight. It is preferable that the components are mixed at elevated temperatures by combining, mixing, kneading, extruding or rolling these together. The mixing temperature is preferably in the range from 220° C. to 340° C., particularly from 240 to 320° C. and specifically from 250 to 300° C. Suitable processes are known to the person skilled in the art.

The colorants of component C in particular can be used in the form of a masterbatch. For this, it is preferable to incorporate the colorant of component C in the polyamide of component A to give a masterbatch with colorant content in the range from 0.1 to 10% by weight, preferably from 0.2 to 5% by weight.

The compound of the general formula (I) can also be used in the form of a masterbatch in polyamide of component A.

However, it is also possible to mix the compound of the general formula (I) with component A and with the masterbatch comprising component C.

The molding compositions of the invention, and the moldings, fibers and films produced therefrom, exhibit increased transparency and are therefore visually attractive. They are therefore in particular suitable for the production of packaging materials, illumination elements, and components in which visibility through the material of the molding composition is important. The quantities of component B and C can be adjusted in accordance with the wall thickness of the appropriate containers in order to achieve suitable transparency.

The examples below provide a more detailed explanation of the invention.

EXAMPLES

The following components were used:
Component A:
Polyamide 6 (PA 6) with intrinsic viscosity IV 150 ml/g, measured on a 0.5% by weight solution in 96% by weight sulfuric acid at 25° C. in accordance with ISO 307. Ultramid® B27 from BASF SE was used.
Component B:
(4-Ureidocyclohexyl)urea
The synthesis of component B is described in WO 2013/139802.
Component C:

| Component | Trade name | Class | Pigment/Dye index No. | CAS No. | Name |
| --- | --- | --- | --- | --- | --- |
| C1 | Macrolex Red 5B | Anthraquinone | Solvent Red 52 | 81-39-0 | 3-Methyl-6-[(4-methylphenyl)amino]-3H-dibenzo[f,ij]isoquinoline-2,7-dione |
| C2 | Oracet Blue 700 FA | Anthraquinone | Solvent Blue 132 | 110157-96-5 | Precise structure not disclosed |
| C3 | Macrolex Green 5B | Anthraquinone | Solvent Green 3 | 128-80-3 | 1,4-Bis(4-methylanilino)anthracene-9,10-dione |
| C4 | PV-Echtorange 6RL | Benzimidazolone | Pigment Orange 68 | 42844-93-9 | [1,3-Dihydro-5,6-bis[[(2-hydroxy-1-naphthyl)methylene]amino]-2H-benzimidazol-2-onato(2-)N5,N6,O5,O6]nickel |
| C5 | Macrolex Red E2G | Perinone | Solvent Red 179 | 89106-94-5 | 14H-Benzo[4,5]isoquino[2,1-a]perimidin-14-one |
| CV1 | Oracet YW 160 | Monoazo, chromate complex | Solvent Yellow 21 | 5601-29-6 | Hydrogen bis[2-[(4,5-dihydro-3-methyl-5-oxo-1-phenyl-1H-pyrazol-4-yl)azo]benzoato]chromate |
| CV2 | Keyplast FL Yellow Green 7G | Perylene | Solvent Green 5 | 79869-59-3 | Isobutyl 5-(4-isobutoxycarbonyl-1-naphthyl)4-methylnaphthalene-1-carboxylate |
| CV3 | Hostasol Yellow 3G | Naphthalinnide (aminoketone) | Solvent Yellow 98 | 12671-74-8 27870-92-4 | 1H-Thioxantheno[ 2,1,9-def]isoquinoline-1,3(2H)dione, 2-octadecyl- |
| CV4 | Hostasol Red GG | Benzanthrone | Solvent Orange 63 | 16294-75-0 | 14H-Anthra[2,1,9-mna]thioxanthen-14-one |

Structural Formulae:

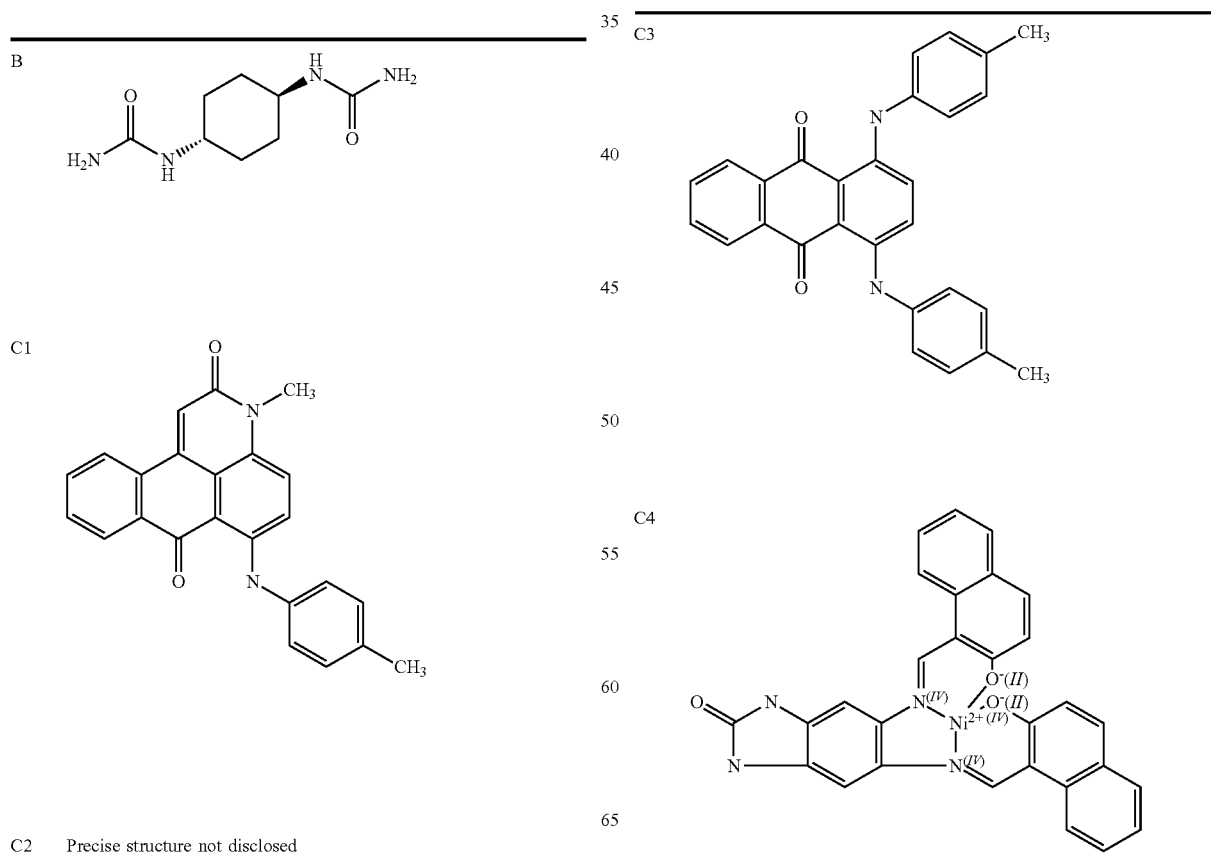

C2   Precise structure not disclosed

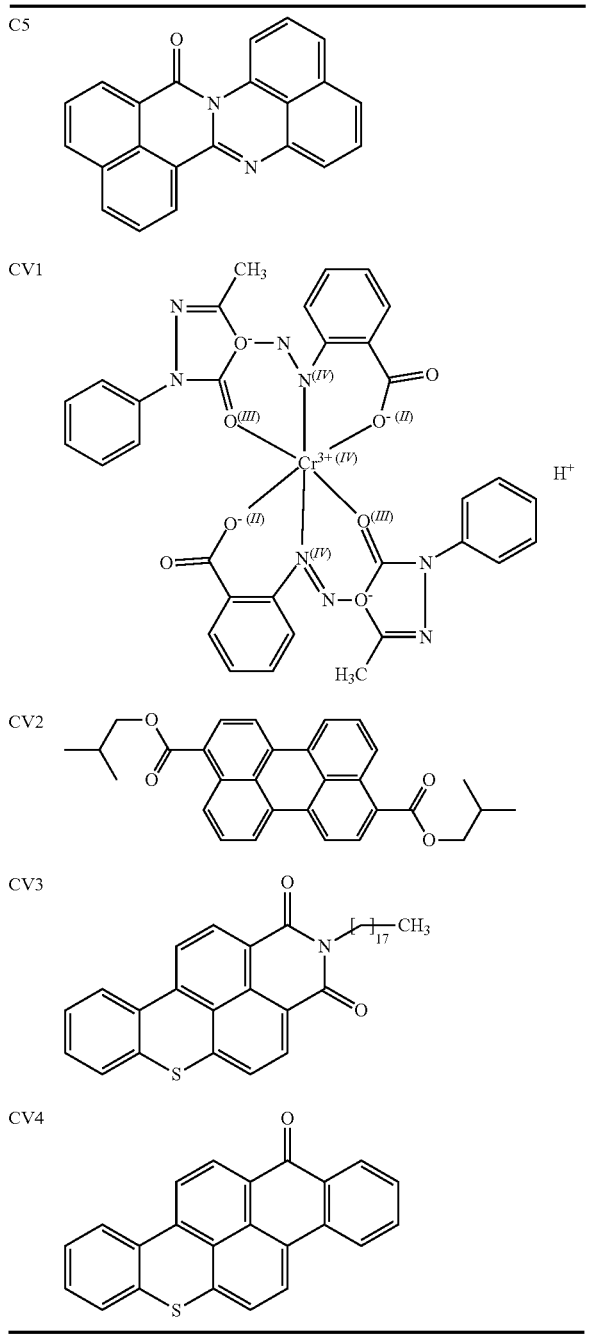

Processing:
Production of PA 6 Composition (AB)
99.0% by weight of Ultramid B27 were compounded under nitrogen with 1.0% by weight of compound B in a conical twin-screw extruder (DSM Xplore, 15cc). In order to obtain a reference sample, the pure polyamide, i.e. with no addition of component B, was processed in the same manner. The following parameters were used:
  residence time: 3 min
  barrel temperature: 260° C.
  melt temperature: 240° C. to 245° C.
  rotation rate: 100 rpm Masterbatch Production by Compounding (MB1-MB9):

In order to achieve better dispersion of the dyes in the polymer, first a masterbatch of each colorant (components C1-C5 and CV1-CV4) was produced in Ultramid B27, the concentration of dye being 2.94% by weight. For this, the polyamide pellets were compounded under nitrogen with the colorant in a conical twin-screw extruder (DSM Xplore, 15cc). In order to obtain a reference sample, the pure polyamide, i.e. with no addition of component C, was processed in the same manner. The following parameters were used:
  residence time: 3 min
  barrel temperature: 260° C.
  melt temperature: 240° C. to 245° C.
  rotation rate: 100 rpm Production of Experimental Examples:

The experimental examples were produced by compounding the polyamide pellets or the polyamide composition AB under nitrogen with the respective color masterbatches (MB1-MB9) in a conical twin-screw extruder (DSM Xplore, 15cc). In order to obtain a reference sample, the pure polyamide, i.e. without additions, was processed in the same manner. The following parameters were used:
  residence time: 3 min
  barrel temperature: 260° C.
  melt temperature: 240° C. to 245° C.
  rotation rate: 100 rpm Processing by Injection Molding:

The compounded polymers were processed by injection molding in a 10 cc DSM micro-injection-molding apparatus. For this, the molten compounded material was charged directly under nitrogen into the cylinder of the injection-molding machine. The melt was then injected into a polished rectangular mold measuring (30 mm×30 mm×1.27 mm). The following parameters were used:
  mold: polished plaque: 30 mm×30 mm×1.27 mm
  mold temperature: 60° C.
  cylinder temperature: 260° C.
  injection pressure: 10 to 12 bar Test Methods:

Optical Properties: Haze and Transmittance

Haze and transmittance were measured at room temperature by using a haze-gard plus tester (BYK, Gardner®, illumination CIE-E). The measurement was made in accordance with ASTM D1003 in the version valid in 2017. The haze values were measured 24-48 h after injection molding.

Formulations for Masterbatch Production

| Example | A (% by wt.) | B (% by wt.) | C1 (% by wt.) | C2 (% by wt.) | C3 (% by wt.) | C4 (% by wt.) | C5 (% by wt.) | CV1 (% by wt.) | CV2 (% by wt.) | CV3 (% by wt.) | CV4 (% by wt.) |
|---|---|---|---|---|---|---|---|---|---|---|---|
| MB1 | 97.06 | — | 2.94 | — | — | — | — | — | — | — | — |
| MB2 | 97.06 | — | — | 2.94 | — | — | — | — | — | — | — |
| MB3 | 97.06 | — | — | — | 2.94 | — | — | — | — | — | — |
| MB4 | 97.06 | — | — | — | — | 2.94 | — | — | — | — | — |
| MB5 | 97.06 | — | — | — | — | — | 2.94 | — | — | — | — |

-continued

| Example | A (% by wt.) | B (% by wt.) | C1 (% by wt.) | C2 (% by wt.) | C3 (% by wt.) | C4 (% by wt.) | C5 (% by wt.) | CV1 (% by wt.) | CV2 (% by wt.) | CV3 (% by wt.) | CV4 (% by wt.) |
|---|---|---|---|---|---|---|---|---|---|---|---|
| MB6 | 97.06 | — | — | — | — | — | — | 2.94 | — | — | — |
| MB7 | 97.06 | — | — | — | — | — | — | — | 2.94 | — | — |
| MB8 | 97.06 | — | — | — | — | — | — | — | — | 2.94 | — |
| MB9 | 97.06 | — | — | — | — | — | — | — | — | — | 2.94 |

Formulations for Production of Compounded Materials

| Example | A (% by wt.) | AB (% by wt.) | MB1 (% by wt.) | MB2 (% by wt.) | MB3 (% by wt.) | MB4 (% by wt.) | MB5 (% by wt.) | MB6 (% by wt.) | MB7 (% by wt.) | MB8 (% by wt.) | MB9 (% by wt.) |
|---|---|---|---|---|---|---|---|---|---|---|---|
| V1 | 100 | | | | | | | | | | |
| V2 | 99.74 | | 0.26 | | | | | | | | |
| V3 | 99.48 | | 0.52 | | | | | | | | |
| V4 | 99.74 | | | 0.26 | | | | | | | |
| V5 | 99.48 | | | 0.52 | | | | | | | |
| V6 | 99.74 | | | | 0.26 | | | | | | |
| V7 | 99.48 | | | | 0.52 | | | | | | |
| V8 | 99.74 | | | | | 0.26 | | | | | |
| V9 | 99.48 | | | | | 0.52 | | | | | |
| V10 | 99.74 | | | | | | 0.26 | | | | |
| V11 | 99.48 | | | | | | 0.52 | | | | |
| V12 | 99.74 | | | | | | | 0.26 | | | |
| V13 | 99.48 | | | | | | | 0.52 | | | |
| V14 | 99.74 | | | | | | | | 0.26 | | |
| V15 | 99.48 | | | | | | | | 0.52 | | |
| V16 | 99.74 | | | | | | | | | 0.26 | |
| V17 | 99.48 | | | | | | | | | 0.52 | |
| V18 | 99.74 | | | | | | | | | | 0.26 |
| V19 | 99.48 | | | | | | | | | | 0.52 |
| V20 | | 100 | | | | | | | | | |
| 1 | | 99.74 | 0.26 | | | | | | | | |
| 2 | | 99.48 | 0.52 | | | | | | | | |
| 3 | | 99.74 | | 0.26 | | | | | | | |
| 4 | | 99.48 | | 0.52 | | | | | | | |
| 5 | | 99.74 | | | 0.26 | | | | | | |
| 6 | | 99.48 | | | 0.52 | | | | | | |
| 7 | | 99.74 | | | | 0.26 | | | | | |
| 8 | | 99.48 | | | | 0.52 | | | | | |
| 9 | | 99.74 | | | | | 0.26 | | | | |
| 10 | | 99.48 | | | | | 0.52 | | | | |
| V21 | | 99.74 | | | | | | 0.26 | | | |
| V22 | | 99.48 | | | | | | 0.52 | | | |
| V23 | | 99.74 | | | | | | | 0.26 | | |
| V24 | | 99.48 | | | | | | | 0.52 | | |
| V25 | | 99.74 | | | | | | | | 0.26 | |
| V26 | | 99.48 | | | | | | | | 0.52 | |
| V27 | | 99.74 | | | | | | | | | 0.26 |
| V28 | | 99.48 | | | | | | | | | 0.52 |

Results:
Composition of Experimental Examples:

| Example | A [% by wt.] | B [% by wt.] | Colorant | Dye concentration [ppm] | Haze Plaque, wall thickness 1.27 mm [%] | Transmittance Plaque, wall thickness 1.27 mm [%] | Haze change relative to reference |
|---|---|---|---|---|---|---|---|
| V1 | 100 | — | none | | 100 | 78 | Reference |
| V2 | 100 | — | C1 | 69 | 97.5 | 39.8 | −2.5% |
| V3 | 100 | — | C1 | 156 | 96.7 | 26.7 | −3.3% |
| V4 | 100 | — | C2 | 69 | 92 | 40 | −8.0% |
| V5 | 100 | — | C2 | 156 | 87 | 26 | −13.0% |
| V6 | 100 | — | C3 | 69 | 92 | 35 | −8.0% |
| V7 | 100 | — | C3 | 156 | 88 | 21 | −12.0% |
| V8 | 100 | — | C4 | 69 | 96.6 | 58.7 | −3.4% |
| V9 | 100 | — | C4 | 156 | 96.6 | 47.2 | −3.4% |

-continued

| Example | A [% by wt.] | B [% by wt.] | Colorant | Dye concentration [ppm] | Haze Plaque, wall thickness 1.27 mm [%] | Transmittance Plaque, wall thickness 1.27 mm [%] | Haze change relative to reference |
|---|---|---|---|---|---|---|---|
| V10 | 100 | — | C5 | 69 | 96 | 43 | −4.0% |
| V11 | 100 | — | C5 | 156 | 93 | 30 | −7.0% |
| V12 | 100 | — | CV1 | 69 | 94 | 60 | −6.0% |
| V13 | 100 | — | CV1 | 156 | 93 | 54 | −7.0% |
| V14 | 100 | — | CV2 | 69 | 96.5 | 82.7 | −3.5% |
| V15 | 100 | — | CV2 | 156 | 97.2 | 82.3 | −2.8% |
| V16 | 100 | — | CV3 | 69 | 97.3 | 82.8 | −2.7% |
| V17 | 100 | — | CV3 | 156 | 97 | 81.5 | −3.0% |
| V18 | 100 | — | CV4 | 69 | 99.6 | 45.1 | −0.4% |
| V19 | 100 | — | CV4 | 156 | 98.1 | 35.1 | −1.9% |
| V20 | 99 | 1 | none |  | 21.9 | 77.7 | Reference |
| 1 | 99 | 1 | C1 | 69 | 15.4 | 41.7 | −29.7% |
| 2 | 99 | 1 | C1 | 156 | 13.8 | 24.7 | −37.0% |
| 3 | 99 | 1 | C2 | 69 | 17.2 | 55.8 | −21.5% |
| 4 | 99 | 1 | C2 | 156 | 12.6 | 40.7 | −42.5% |
| 5 | 99 | 1 | C3 | 69 | 13.7 | 49.5 | −37.4% |
| 6 | 99 | 1 | C3 | 156 | 12 | 33.7 | −45.2% |
| 7 | 99 | 1 | C4 | 69 | 16.8 | 53.6 | −23.3% |
| 8 | 99 | 1 | C4 | 156 | 15.9 | 42 | −27.4% |
| 9 | 99 | 1 | C5 | 69 | 16 | 56.3 | −26.9% |
| 10 | 99 | 1 | C5 | 156 | 9.8 | 43 | −55.3% |
| V21 | 99 | 1 | CV1 | 69 | 17.6 | 66.8 | −19.6% |
| V22 | 99 | 1 | CV1 | 156 | 19.7 | 71.3 | −10.0% |
| V23 | 99 | 1 | CV2 | 69 | 27.5 | 77.3 | 25.6% |
| V24 | 99 | 1 | CV2 | 156 | 28.7 | 76.9 | 31.1% |
| V25 | 99 | 1 | CV3 | 69 | 27.2 | 76.1 | 24.2% |
| V26 | 99 | 1 | CV3 | 156 | 31.1 | 74.4 | 42.0% |
| V27 | 99 | 1 | CV4 | 69 | 24.3 | 45.5 | 11.0% |
| V28 | 99 | 1 | CV4 | 156 | 27.9 | 32.3 | 27.4% |

Inventive examples 1 to 10: addition of component C to the polyamide composition AB leads to a relative haze decrease of at least 20% at 69 ppm and at least 25% at 156 ppm content of component C. Non-inventive examples are polyamide compositions made of component A and component C (without component B), and also polyamide compositions made of components A and CV, and also A, B and CV. The relative haze decrease in each of these is less than 20% at 69 ppm of component C or CV and less than 25% at 156 ppm of component C or CV.

As is apparent from the inventive examples and the comparative examples, anthraquinone colorants, benzimidazolone colorants and perinone colorants are suitable for improving the optical properties of the molding compositions. Other colorants, for example chromate complexes, perylene dyes, naphthalimide dyes or benzanthrone dyes, led to no, or to inadequate, improvement of optical properties.

The invention claimed is:

1. A method of reducing a haze value, the method comprising:
   using colorants selected from anthraquinone colorants, benzimidazolone colorants and perinone colorants, in molding compositions comprising at least one polyamide and at least one compound of the general formula (I)

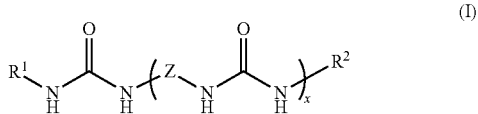

(I)

wherein
   x is 1, 2 or 3;
   $R^1$ and $R^2$ are mutually independently selected from hydrogen, linear $C_1$-$C_7$-alkyl, branched $C_3$-$C_{10}$-alkyl, unsubstituted or substituted $C_3$-$C_{12}$-cycloalkyl, unsubstituted or substituted $C_3$-$C_{12}$-cycloalkyl-$C_1$-$C_4$-alkyl, unsubstituted or substituted aryl and unsubstituted or substituted aryl-$C_1$-$C_4$-alkyl, and Z is selected from $C_3$-$C_{10}$-alkanediyl, unsubstituted or substituted arylene, unsubstituted or substituted arylene-$C_1$-$C_4$-alkylene-arylene, unsubstituted or substituted heteroarylene, unsubstituted or substituted heteroarylene-$C_1$-$C_4$-alkylene-heteroarylene, unsubstituted or substituted $C_5$-$C_8$-cyclo-alkylene, unsubstituted or substituted $C_5$-$C_8$-cycloalkylene-$C_1$-$C_4$-alkylene-$C_5$-$C_8$-cyclo-alkylene, unsubstituted or substituted heterocycloalkylene and unsubstituted or substituted heterocycloalkylene-$C_1$-$C_4$-alkylene-heterocycloalkylene;
   wherein the haze value is reduced by at least 10%, determined by ASTM D1003 with a layer thickness of 1.27 mm in comparison with a reference polyamide composition without the colorants.

2. The method according to claim 1, wherein the quantity used of the colorants is from 10 to 1000 ppm, based on the entire molding composition.

3. The method according to claim 1, wherein the ratio by weight in which the colorants are used in relation to the at least one compound of the general formula (I) is in the range from 1:1 to 1:1000.

4. The method according to claim 1, characterized in that the colorants are dyes, pigments or mixtures of these.

5. The method according to claim 1, wherein the colorant is a benzimidazolone colorant.

6. A molding composition comprising:

as component A, at least one polyamide;

as component B, from 0.1 to 2% by weight of at least one compound of the general formula (I),

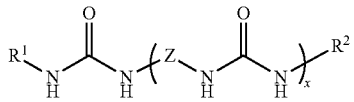

(I)

where x is 1, 2 or 3;

R$^1$ and R$^2$ are mutually independently selected from hydrogen, linear C$_1$-C$_7$-alkyl, branched C$_3$-C$_{10}$-alkyl, unsubstituted or substituted C$_3$-C$_{12}$-cycloalkyl, unsubstituted or substituted C$_3$-C$_{12}$-cycloalkyl-C$_1$-C$_4$-alkyl, unsubstituted or substituted aryl and unsubstituted or substituted aryl-C$_1$-C$_4$-alkyl, and Z is selected from C$_3$-C$_{10}$-alkanediyl, unsubstituted or substituted arylene, unsubstituted or substituted arylene-C$_1$-C$_4$-alkylene-arylene, unsubstituted or substituted heteroarylene, unsubstituted or substituted heteroarylene-C$_1$-C$_4$-alkylene-heteroarylene, unsubstituted or substituted C$_5$-C$_8$-cyclo-alkylene, unsubstituted or substituted C$_5$-C$_8$-cycloalkylene-C$_1$-C$_4$-alkylene-C$_5$-C$_8$-cyclo-alkylene, unsubstituted or substituted heterocycloalkylene and unsubstituted or substituted heterocycloalkylene-C$_1$-C$_4$-alkylene-heterocycloalkylene; and as component C, from 10 to 1000 ppm of at least one colorant selected from anthraquinone colorants, benzimidazolone colorants and perinone colorants and mixtures thereof, where the quantities are based on the entire molding composition.

7. The molding composition according to claim 6, which comprises at least 60% by weight of component A.

8. The molding composition according to claim 7, which comprises at least 80% by weight of component A.

9. The molding composition according to claim 8, which comprises at least 90% by weight of component A.

10. The molding composition according to claim 6, wherein the quantity of component B is from 0.2 to 1.7% by weight.

11. The molding composition according to claim 10, wherein the quantity of component B is from 0.5 to 1.5% by weight.

12. The molding composition according to claim 6, wherein the quantity of component C is from 20 to 500 ppm.

13. The molding composition according to claim 12, wherein the quantity of component C is from 50 to 200 ppm.

14. The molding composition according to claim 6, wherein the ratio by weight of component C to component B is from 1:1 to 1:1000.

15. The molding composition according to claim 14, wherein the ratio by weight of component C to component B is from 1:5 to 1:700.

16. The molding composition according to claim 15, wherein the ratio by weight of component C to component B is from 1:10 to 1:500.

17. The molding composition according to claim 6, wherein Z in the compound of the general formula (I) is trans-1,4-cyclohexylene.

18. The molding composition according to claim 17, wherein in the compound of the general formula (I) R$^1$ and R$^2$ are identical and are selected from hydrogen, tert-butyl, 1,1-dimethylpropyl, 1,5-dimethylhexyl, 1,1,3,3-tetramethylbutyl and 1-adamantyl, Z is trans-1,4-cyclohexylene and x is 1.

19. The molding composition according to claim 6, wherein the colorant is a benzimidazolone colorant.

20. A process for the production of molding compositions according to claim 6, which comprises mixing, with one another, components A, B and C and optionally other ingredients.

21. A method of producing fibers, films, or moldings, the method comprising using the molding compositions according to claim 6.

22. A fiber, film or molding made of a molding composition according to claim 6.

* * * * *